United States Patent [19]
Camezon

[11] Patent Number: 5,154,270
[45] Date of Patent: Oct. 13, 1992

[54] CONTAINER RACEWAY

[76] Inventor: Raymond Camezon, P.O. Box 2526, Danville, Calif. 94526

[21] Appl. No.: 686,032

[22] Filed: Apr. 16, 1991

[51] Int. Cl.⁵ .............................................. B65G 11/10
[52] U.S. Cl. ............................ 193/25 R; 193/25 FT; 193/38
[58] Field of Search ................... 193/2 R, 25 R, 25 E, 193/25 S, 25 FT, 33, 34, 38, 41; 198/836.1

[56] References Cited
U.S. PATENT DOCUMENTS 3,077,969  2/1963  Raffe ..................................... 193/38
3,797,624  3/1974  Powell et al. ...................... 193/25 R
4,958,725  9/1990  Meade et al. ...................... 198/836.1

*Primary Examiner*—Joseph E. Valenza
*Attorney, Agent, or Firm*—Bielen, Peterson & Lampe

[57] ABSTRACT

A raceway for guiding containers relative to a structure utilizing a yoke which is anchored to the structure. Elongated rods are each fastened in spaced relationship to the yoke structure by a clamp. The clamp includes a body portion with a slot for holding each of the rods while extending a portion of each of the rods beyond the body of the clamp.

5 Claims, 1 Drawing Sheet

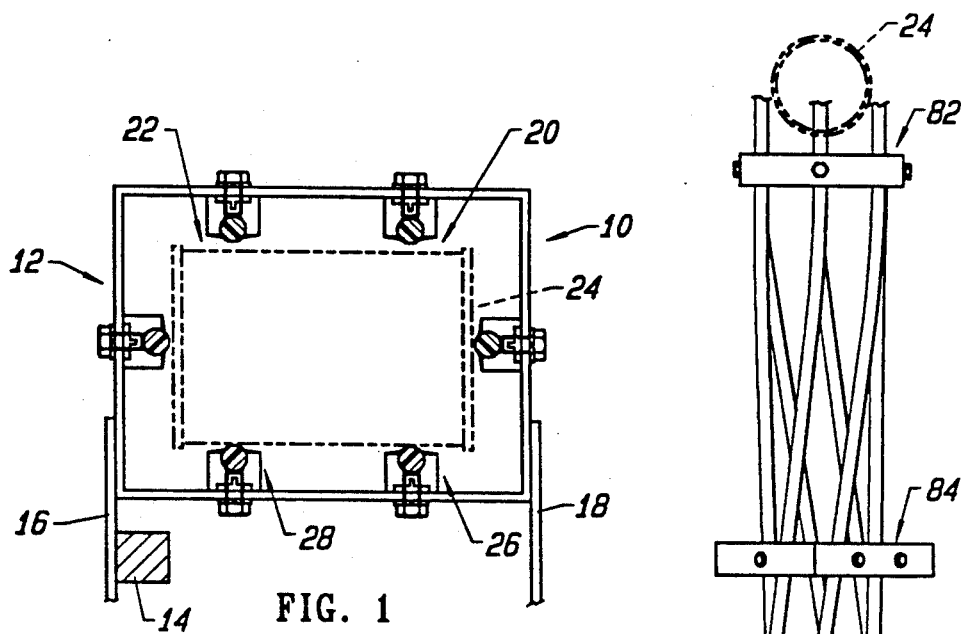
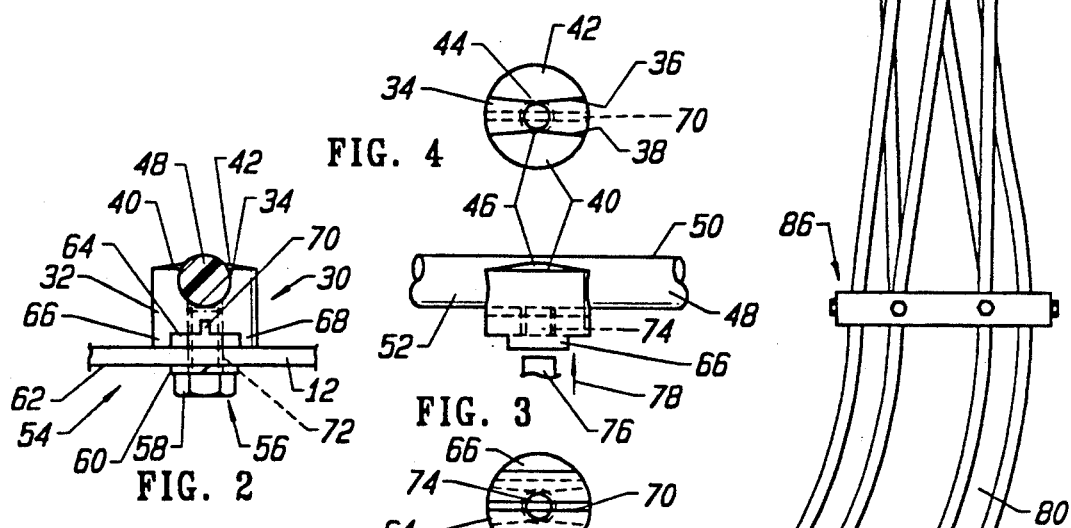
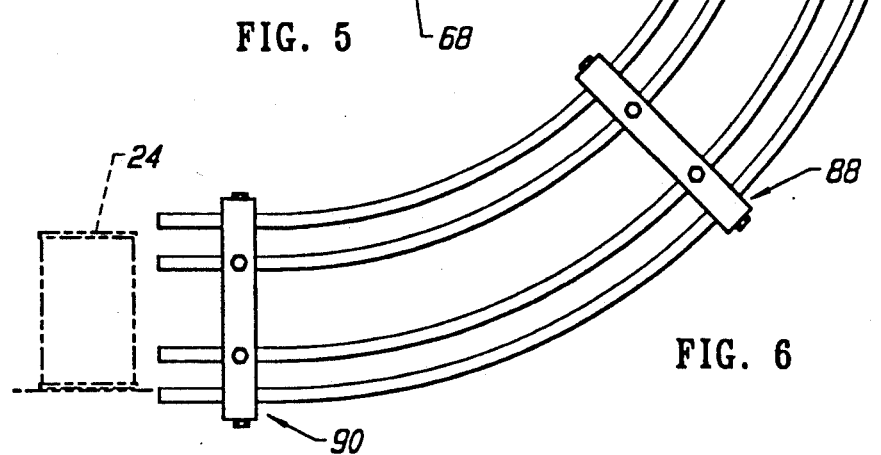

CONTAINER RACEWAY

BACKGROUND OF THE INVENTION

The present invention relates to a novel and useful container raceway mechanism which is especially useful in a cannery.

The commercial canning of foods requires quick and certain movement of cans within a facility. In the past, raceways have been developed to roll or slide the cans between operations, such as filling, labeling and the like. Prior raceways consist of fixtures holding generally parallel steel rods which form a rolling chamber within the adjacent rods. Construction of such a steel raceway of this type involves rod bending tools and welding efforts. Raceway construction labor is especially acute if the rods must bent into a turn for the rolling cans. In addition, steel rods used to construct raceways for cans produce a substantial amount of noise. Further, steel rods become roughened after time and tend to mar moving cans and labels on such cans. This latter problem is especially apparent when lithographed or aluminum containers are transported on steel rod raceways. Moreover, roughened steel rods greatly increase the already substantial noise level in a cannery.

A raceway system which solves such problems encountered in the prior art would be a great advance in the food processing industry.

SUMMARY OF THE INVENTION

In accordance with the present invention a novel and useful raceway for containers is herein provided.

The raceway of the present invention includes at least one yoke and means for anchoring the yoke to a structure. The yoke would form a generally closed loop and determine the dimension of the eventual raceway being constructed. A plurality of a elongated rods formed of flexible material is also employed with the raceway of the present invention. Such plurality of rods may be ideally constructed from non-metallic material, such as a plastic, having a low degree of surface friction when contacting a container or can. In addition, the plurality of elongated rods may possess a mechanism memory or resilience, as well as high degree of wear resistance to the rolling containers.

The raceway of the present invention also includes means for fastening the plurality of rods to one or more yokes. Such means may be formed by employing a clamp having a body portion with an opening or slot through the same. Each rod would be capable of slipping or passing through the slot or opening such that a portion of the outer surface of the rod would be exposed to the inner portion of the raceway without interference from the clamp. Each clamp may also include another slot forming first and second legs which extend outwardly from the body of the clamp. The legs and the slot forming such legs would be in general opposition to the slot holding the flexible rod.

Means is also envisioned in the present invention for fastening clamp to the yoke. Such fastening means may employ a fastener in the form of a threaded machine screw or bolt which extends through the yoke and the body portion of the clamp into contact with the rod. The slot surrounding the rod would include opposing wall portions such that the fastener would urge or drive the rod into contact with the wall portions. In addition, the fastener would contact a portion of the yoke and force the same against the pair of legs extending from the body of the clamp. By this urging, the legs would tend to force the opposing wall portions of the rod holding slot into contact with the rod and firmly hold the same in place. A crevice may be formed between the first and second legs extending from the body of the clamp to accentuate the grabbing action of the opposing walls in the slot holding the flexible rod.

It may be apparent that a plurality of yokes may be employed each having a plurality of clamps for the particular number of flexible rods employed in the raceway of the present invention. Some of the yokes may be unsupported between supported yokes especially where empty containers are being transported through the raceway. Moreover, the yokes and supported rods may be turned and twisted into various configurations to form raceway of any configuration.

It may be apparent that a novel and useful raceway for guiding containers has been described.

It is therefore an object of the present invention to provide a raceway for containers which is simple and quick to install since the rod bending and welding work found in the prior art has been eliminated.

It is another object of the present invention to provide a raceway for container which is less expensive to install and maintain.

Yet another object of the present invention is to provide a raceway for containers which greatly reduces noise in food processing facilities such as canneries.

Another object of the present invention is to provide a raceway for containers which obviates damage imparted to the containers being transported by physical contact with the raceway hardware.

A further object of the present invention is to provide a raceway for containers which is particularly adaptable to gravity feed systems and systems including multitudinous twists and turns.

Another object of the present invention is to provide a raceway for containers which is relatively simple to repair and maintain.

Yet another object of the present invention is to provide a raceway for containers which greatly reduces container jams which are a major factor in reducing the overall output of a food processing facility.

Another object of the present invention is to provide a raceway for containers which possesses reusable parts, thus greatly increasing the overall efficiency of the raceway mechanism.

A further objective of the present invention is to provide a raceway for containers which is capable of eliminating certain yoke supports when processing empty cans.

The invention possesses other advantages especially as concerns particular characteristics and features thereof which will become apparent as the specification continues.

BRIEF DESCRIPTION OF THE DRAWINGS

FIG. 1 is a sectional view of a raceway of the present invention showing a rolling container on such raceway.

FIG. 2 is a front elevational view of the clamp used in the present invention showing a flexible rod section.

FIG. 3 is a side elevational view of clamp of the present invention holding a flexible raceway rod.

FIG. 4 is a top plan view of the clamp employed in the present invention.

FIG. 5 is a bottom plan view of the clamp employed in the present invention.

FIG. 6 is a top plan view of a raceway erected employing yokes and clamps of the present invention showing a 90° twist and a 90° turn.

For a better understanding of the invention reference is made to the following detailed description of the preferred embodiments which should be referenced to the hereinabove described drawings.

DESCRIPTION OF THE PREFERRED EMBODIMENTS

Various aspects of the present invention will evolve from the following detailed description of the preferred embodiments which should be referenced to the prior described drawings.

The invention as a whole is shown in the drawings by reference character 10. Raceway 10 includes as one of its elements a yoke 12. As depicted in FIG. 1, yoke 12 has a rectangular configuration. Yoke 12 may be composed of any rigid or semi-rigid material such as metal, plastic and the like. Yoke 12 may be fastened to a structure such as bar 14 by any suitable means. FIG. 1 depicts yoke 12 as being welded to bar 14 by the use of a strap 16. Strap 18, on the opposite side of yoke 12, may be fixed to a similar bar structure (not shown). Yoke 12 is depicted as supporting a plurality of elongated rods 20. Rods may be formed of non-metallic material such as polymeric plastic, including Nylon, teflon, polycarbonate, and the like. In any case, it is important that plurality of rods 20 be flexible, and in certain cases, possess a mechanical memory. The plurality of rods 20 form a raceway 22 which is depicted in FIG. 1, as being occupied by a food can 24.

Means 26 is also included in the present invention for fastening plurality of rods 20 to yoke 12. With reference to FIGS. 2-5, it may be observed that a typical clamp 30 of multiplicity of clamps 28 is depicted in detail. Clamp 30 includes as one of its elements a body portion 32 with a slot 34 extending through the same. Slot 34 is circular in cross-sectional configuration, FIG. 2. Upper surfaces 40 and 42 of body 30, FIG. 4, are slightly curved and form peaks 44 and 46, respectively. Slot 34 is sized to accommodate a flexible rod 48 of the type of plurality of rods 20 depicted in FIG. 1. It may be observed, from FIG. 3, that a portion 50 of the outer surface 52 of rod 48 extends above peaks 44 and 46 of clamp body 32. Thus, a can, such as can 24, moving in raceway 22 does not normally contact the upper surfaces 40 and 42 of clamp 30.

Means 54 is also included in the present invention for fastening clamp 30 to yoke 12. Means 54 may include a threaded bolt 56. As illustrated in FIG. 2, threaded bolt 56 includes a hexagonal head 58 which sandwiches a washer 60 to the outer surface 62 of yoke 12 relative to raceway 22. Body 32 of clamp 30 possesses another slot 64 which extends through the same and forms a pair of legs 66 and 68. A crevice 70, FIGS. 2 and 5, extends along the crown of slot 64 and further defines legs 66 and 68. Threaded bolt 56 extends through an opening 72 and yoke 12 and threadingly engages an opening 74 of body 32. Opening 74 extends between slot 64 and rod holding slot 34. Consequently, threaded shaft 76 of threaded bolt 56 threads through opening 74 according to directional arrow 78, FIG. 3. Threaded shaft 76 is capable of contacting outer surface 52 of rod 48 in the configuration depicted in FIG. 2.

In operation, plurality of flexible rods 20 are fastened to the yoke such as yoke 12 by the use of multiplicity of clamps 28. A raceway 22 of a particular dimension, determined by yoke 12, is created. In this regard, individual rods and clamps, exemplified by rod 48 and clamp 30, are assembled by sliding rod 48 into slot 32. Yoke 12 is connected to clamp 30 by the use of threaded bolt 56 which forces yoke 12 via intermediate washer 60 into contact with legs 66 and 68. Threaded bolt shaft 76 bears on outer surface 52 and forces rod 48 upwardly against opposing wall portions 36 and 38 of slot 34. The contact of outer surface 62 of yoke 12 with legs 66 and 68 prevents separation of wall portions 36 and 38 of slot 34. Thus, rod 48 is held snuggly within slot 34. Each rod of the plurality of rods 20 includes a surface, such as surface 50 of rod 48, which is free of a particular clamp holding such rod. Thus, can 24 which rolls and/or slides down raceway 22 does not contact any of the multiplicity of clamps 28. With reference to FIG. 6 it may be observed that a raceway 80 has been formed using yokes 82, 84, 86, 88, and 90. Although such yokes are depicted as being unsupported in FIG. 6, each may be fastened to a structure such as bar 14 or the like by any suitable means. It has been found, that where light or empty cans are being transported down raceway 80, certain yokes may remain unsupported between supported yokes. Food container 24 is depicted at the top of FIG. 6 as entering raceway 20 in the vicinity of yoke 82. Between yoke 82 and yoke 86 raceway 80 has taken a 90° twist such that can 24 will turn 90° when traveling through raceway 80. Between yoke 86 and yoke 90, food container 24 has been routed through a 90° turn. Raceway 80 may be very easily altered in size or direction without the prior necessity of employing rod bending devices and welding equipment.

While in the foregoing embodiments of the invention have been set forth in considerable detail for the purpose of making a complete disclosure of the invention it may be apparent to those of skill in the art that numerous changes may be made in such details without departing from the spirit and principles of the invention.

I claim:

1. A raceway for guiding of containers relative to a structure,
   comprising
   a. a yoke including means for anchoring said yoke to the structure;
   b. a plurality of elongated rods formed of flexible material;
   c. means for fastening said plurality of rods to said yoke including at leas one clamp having a body portion with first and second slots therethrough, at least one of said plurality of rods being capable of passing through said slot and extending through a continuous portion of the outer surface of said rod a selected distance from said, said first and second slots forming first and second legs each being capable of contacting said yoke, said second slot including a crevice extending toward said first slot; and
   d. means for fastening said clamp to said yoke, including a fastener extending through said body portion of said clamp and bearing on said one rod, said fastener including means for urging said one rod away from said yoke and for urging said first and second legs toward said yoke.

2. The raceway of claim 1 in which said fastener urging means includes a threaded shaft and a threaded bore within said clamp body said threaded shaft being capable of threadingly engaging said threaded bores of said clamp body.

3. The raceway of claim 1 in which said yoke includes a first surface and an opposite second surface, said first and second legs bearing on said first surface of said yoke and said fastener includes a flange bearing on said second surface of said yoke.

4. The raceway of claim 3 in which said one rod is composed of polymeric material.

5. The raceway of claim 3 in which said one rod is composed of electrically insulative material.

* * * * *